US012281283B2

(12) United States Patent
Bueno Romo et al.

(10) Patent No.: US 12,281,283 B2
(45) Date of Patent: Apr. 22, 2025

(54) METHOD OF LAUNDERING FABRIC

(71) Applicant: The Procter & Gamble Company, Cincinnati, OH (US)

(72) Inventors: Laura Bueno Romo, Newcastle upon Tyne (GB); Carlos Amador Zamarreno, Newcastle upon Tyne (GB); Anju Deepali Massey Brooker, Newcastle upon Tyne (GB); Libbi Moon, Newcastle upon Tyne (GB); Philip Frank Souter, Northumberland (GB); Eric San Jose Robles, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 540 days.

(21) Appl. No.: 17/061,585

(22) Filed: Oct. 2, 2020

(65) Prior Publication Data

US 2021/0108156 A1 Apr. 15, 2021

(30) Foreign Application Priority Data

Oct. 11, 2019 (EP) .................................... 19202665

(51) Int. Cl.

*C11D 3/04* (2006.01)
*C11D 1/22* (2006.01)
*C11D 3/20* (2006.01)
*C11D 3/36* (2006.01)
*C11D 3/386* (2006.01)

(52) U.S. Cl.

CPC ................ *C11D 3/046* (2013.01); *C11D 1/22* (2013.01); *C11D 3/2086* (2013.01); *C11D 3/361* (2013.01); *C11D 3/364* (2013.01); *C11D 3/38618* (2013.01); *C11D 2111/12* (2024.01)

(58) Field of Classification Search

CPC ......... C11D 3/046; C11D 1/22; C11D 3/2086; C11D 3/361; C11D 3/364; C11D 3/38618; C11D 11/0017; C11D 11/0064

See application file for complete search history.

(56) References Cited

U.S. PATENT DOCUMENTS

| | | | | |
|---|---|---|---|---|
| 4,228,044 | A | 10/1980 | Cambre | |
| 4,407,722 | A | 10/1983 | Davies | |
| 4,888,123 | A | 12/1989 | Price | |
| 6,608,015 | B2 * | 8/2003 | Busch | C11D 3/3935 510/311 |
| 7,125,832 | B2 * | 10/2006 | Busch | C11D 3/3932 510/305 |
| 7,479,165 | B2 | 1/2009 | Birker | |
| 8,399,396 | B2 | 3/2013 | Gardner | |
| 8,802,611 | B2 | 8/2014 | Miralles | |
| 9,150,993 | B2 | 10/2015 | Bennett et al. | |
| 10,426,162 | B2 * | 10/2019 | Man | A61P 17/00 |
| 11,044,907 | B2 * | 6/2021 | Man | A01N 25/30 |
| 2005/0130860 | A1 | 6/2005 | Birker | |
| 2006/0234893 | A1 * | 10/2006 | Busch | C11D 3/3945 510/376 |
| 2008/0125343 | A1 * | 5/2008 | Busch | C11D 3/3932 510/309 |
| 2018/0042228 | A1 * | 2/2018 | Man | A61P 17/00 |
| 2019/0380335 | A1 * | 12/2019 | Man | A61P 17/00 |
| 2021/0274781 | A1 * | 9/2021 | Man | A01N 25/30 |

FOREIGN PATENT DOCUMENTS

| | | | | |
|---|---|---|---|---|
| CN | 105647678 | A | 6/2016 | |
| CN | 110184136 | A | 8/2019 | |
| EP | 1065259 | A1 | 1/2001 | |
| GB | 1442418 | A | 7/1976 | |
| JP | S61132674 | A | 6/1986 | |
| JP | 2003041480 | A | 2/2003 | |
| JP | 2016506428 | A | 3/2016 | |
| WO | 9704067 | A1 | 2/1997 | |
| WO | WO-9949009 | A1 * | 9/1999 | C11D 3/3723 |
| WO | 2014089808 | A1 | 6/2014 | |

OTHER PUBLICATIONS

EP Search Report for appl. No. 19202665.6-1106, dated Dec. 2, 2019, 6 pages.
International Search Report and Written Opinion; Application Ser. No. PCT/US2020/070605; dated Oct. 30, 2020, 11 pages.
Extended EP Search Report and Written Opinion for 20199805.1 dated Nov. 20, 2020, 5 pages.

* cited by examiner

*Primary Examiner* — Angela C Brown-Pettigrew
*Assistant Examiner* — Preeti Kumar
(74) *Attorney, Agent, or Firm* — Andrew J. Mueller

(57) ABSTRACT

A method of laundering fabrics includes: a) contacting a laundry detergent to water to form a wash liquor, wherein the laundry detergent includes detersive surfactant, wherein the wash liquor includes detersive surfactant at a concentration in the range of from 100 ppm to 2500 ppm; b) contacting fabric to the wash liquor, and washing the fabric in the wash liquor; c) after a period of time of at least 6 minutes from contacting the fabric to the wash liquor, introducing calcium cations into the wash liquor to form a calcium enriched wash liquor, wherein the calcium enriched wash liquor includes calcium cations at a concentration in the range of from 20 ppm to 400 ppm; d) washing the fabric in the calcium-enriched wash liquor for a period of time of at least 2 minutes; and e) removing the excess calcium-enriched wash liquor from the fabric, and rinsing the fabric in water.

12 Claims, No Drawings

METHOD OF LAUNDERING FABRIC

FIELD OF THE INVENTION

The present invention relates to a method of laundering fabric. The method introduces calcium cations midway through the washing cycle. The method provides improved cleaning performance, especially against soils such as makeup, and grease. The method also mitigates against unwanted stain removal performance skews, such as poor grass stain removal that can be observed when calcium is introduced into a wash liquor.

BACKGROUND OF THE INVENTION

The presence of calcium in the wash liquor of an automatic washing machine during the wash is required for enzyme stability and improved surfactant performance via enhanced packing and emulsification properties. Hence, the presence of calcium can lead to improved cleaning performance of surfactant sensitive stains such as grease soils. However, excess concentration of calcium during the wash early on, can also lead to the precipitation of some hardness sensitive surfactants such as sodium dodecyl benzenesulfonate (LAS) and poor cleaning performance of hardness sensitive types of soils such as scrubbed grass. Therefore, developing a system that can adapt the calcium level through the wash to maximize greasy removal performance while minimizing the negatives on scrubbed grass is desirable.

There is a need to provide a method of treating fabrics to achieve improved cleaning performance for grease soils while maintaining the cleaning efficacy for other types of soils without adding more types/amounts of detersive actives into the wash cycle. Such achievement is preferably accomplished without significantly increasing manufacturing costs associated with the wash additives or operating costs/energy consumption associated with the automatic washing machine.

SUMMARY OF THE INVENTION

The present invention provides a method of laundering fabrics comprises the steps of:

(a) contacting a laundry detergent to water to form a wash liquor, wherein the laundry detergent comprises detersive surfactant, and wherein the wash liquor comprises detersive surfactant at a concentration in the range of from 100 ppm to 2500 ppm;

(b) contacting fabric to the wash liquor, and washing the fabric in the wash liquor;

(c) after a period of time of at least 6 minutes from contacting the fabric to the wash liquor, introducing calcium cations into the wash liquor to form a calcium enriched wash liquor, wherein the calcium enriched wash liquor comprises calcium cations at a concentration in the range of from 20 ppm to 400 ppm;

(d) washing the fabric in the calcium-enriched wash liquor for a period of time of at least 2 minutes; and (e) removing the excess calcium-enriched wash liquor from the fabric and rinsing the fabric in water.

DETAILED DESCRIPTION OF THE INVENTION

Method of Laundering Fabrics

The method of laundering fabrics comprises the steps of:

(a) contacting a laundry detergent to water to form a wash liquor, wherein the laundry detergent comprises detersive surfactant, and wherein the wash liquor comprises detersive surfactant at a concentration in the range of from 100 ppm to 2500 ppm;

(b) contacting fabric to the wash liquor, and washing the fabric in the wash liquor;

(c) after a period of time of at least 6 minutes from contacting the fabric to the wash liquor, introducing calcium cations into the wash liquor to form a calcium enriched wash liquor, wherein the calcium enriched wash liquor comprises calcium cations at a concentration in the range of from 20 ppm to 400 ppm;

(d) washing the fabric in the calcium-enriched wash liquor for a period of time of at least 2 minutes; and (e) removing the excess calcium-enriched wash liquor from the fabric, and rinsing the fabric in water.

The fabrics may be pre-treated with a chelant prior to contacting the fabric with the wash liquor in step (b).

Step (a), Forming the Wash Liquor

In step (a), the laundry detergent is contacted to water to form a wash liquor.

Typically, the laundry detergent comprises detersive surfactant, and the wash liquor formed in step (a) comprises detersive surfactant at a concentration in the range of from 100 ppm to 2500 ppm, or from 300 ppm to 2500 ppm.

Preferably, the laundry detergent comprises chelant, and the wash liquor formed in step (a) comprises chelant at a concentration in the range of from above 0 ppm to 300 ppm, or from 10 ppm to 300 ppm, or from 50 ppm to 300 ppm, or even from 100 ppm to 300 ppm.

Step (b), Washing the Fabric

In step (b), fabric is contacted to the wash liquor, and the fabric is washed in the wash liquor.

Step (c), Calcium Cation Introduction

In step (c), after a period of time of at least 6 minutes from contacting the fabric to the wash liquor, calcium cations are introduced into the wash liquor to form a calcium enriched wash liquor. It may be preferred that in step (c), after a period of time of at least 8 minutes, or at least 10 minutes, or even at least 15 minutes from contacting the fabric to the wash liquor, calcium cations are introduced into the wash liquor to form a calcium enriched wash liquor.

The calcium cations in step (c) may be introduced into the wash liquor in the form of an aqueous calcium slurry. The aqueous calcium slurry is described in more detail below.

Typically, the calcium enriched wash liquor formed in step (c) comprises calcium cation at a concentration in the range of from 20 ppm to 400 ppm, or from 50 ppm to 300 ppm, or from 10 ppm to 300 ppm, or from 50 ppm to 300 ppm, or even from 100 ppm to 300 ppm.

Step (d), Washing in a Calcium Enriched Wash Liquor

In step (d), the fabric is washed in the calcium enriched wash liquor for a period of time of at least 2 minutes.

Step (e), Rinsing

In step (e), excess calcium enriched wash liquor is removed from the fabric, and the fabric is rinsed in water.

Calcium Cation

The calcium cation is typically in the form of a salt. Suitable calcium salts are: calcium acetate; calcium arsenate; calcium azide; calcium benzoate; calcium bicarbonate; calcium bromate; calcium bromide; calcium carbonate (aragonite); calcium carbonate (calcite); calcium chlorate; calcium perchlorate tetrahydrate; calcium chloride; calcium chloride dihydrate; calcium chloride hexahydrate; calcium cyanamide; calcium chromate; calcium citrate; calcium fluoride; calcium fluorosilicate; calcium formate; dicalcium phosphate; calcium hydride; calcium hydroxide; calcium iodate; calcium iodide; calcium molybdate; calcium nitrate; calcium nitrate tetrahydrate; calcium nitrite; calcium nitrite tetrahydrate; calcium oxalate; calcium oxalate hydrate; calcium oxide; calcium perchlorate; calcium permanganate; calcium phosphate; monocalcium phosphate; calcium phosphate tribasic; calcium selenite; calcium sulfate; calcium tungstate; calcium thiocyanate tetrahydrate; hydroxyapatite; and any combination thereof.

A preferred calcium salt is calcium carbonate.

Aqueous Calcium Slurry

Typically, the aqueous calcium slurry comprises from 5 wt % to 80 wt %, or from 10 wt % to 70 wt %, or from 20 wt % to 70 wt %, or from 30 wt % to 70 wt %, calcium salt.

The aqueous calcium slurry is typically formed by contacting calcium cations, such as calcium salt, to water to form an aqueous calcium slurry.

Laundry Detergent

The laundry detergent typically comprises detersive surfactant. The laundry detergent may comprise chelant, and optionally other detergent ingredients. The detergent ingredients are described in more detail below.

Preferably, the detersive surfactant comprises alkyl benzene sulphonate.

Suitable chelants are selected from the group consisting of: hydroxyethylidene diphosphonic acid (HEDP) and salts thereof; diethylene triamine penta(methylenephosphonic) acid (DTPMP) and salts thereof; ethylene diamine tetra (methylenephosphonic) acid (DDTMP) and salts thereof; amino tris(methylenephosphonic) acid (ATMP) and salts thereof; nitrilo tetra(methylenephosphonic) acid (NTMP) and salts thereof; ethylene diamine tetra(methylenephosphonic) acid (EDTMP) and salts thereof; tetraethylene diamine tetra(methylenephosphonic) acid (TDTMP) and salts thereof; hexamethylene diamine tetra(methylenephosphonic) acid (HDTMP) and salts thereof; diethylene triamine pentaacetic acid (DTPA) and salts thereof; ethylene diamine tetraacetic acid (EDTA) and salts thereof; hydroxyethylethylene diamine triacetic acid (HEDTA) and salts thereof; ethylene diamine disuccinic acid (EDDS) and salts thereof; disulfonated catechol, methylglycine diacetic acid (MGDA) and salts thereof; hydroxyiminodisuccinic acid (HIDS) (GLDA) and salts thereof; and any combination thereof.

Preferably, the chelant is selected from hydroxyethylidene diphosphonic acid (HEDP) and salts thereof; diethylene triamine penta(methylenephosphonic) acid (DTPMP) and salts thereof.

The laundry detergent may comprise amylase enzyme.

The laundry detergent may comprise citric acid.

Test Methods

Stain Removal Measurement:

The extent of stain removal performance achieved by any wash cycle is calculated as the color difference between the stain and the textile's background before and after wash. The initial color difference is defined as initial noticeability ($IN_i$, Equation 1), whereas the final noticeability ($FN_i$, Equation 2) refers to the color difference between the stains after the wash and the textiles initial background. The Stain Removal Index ($SRI_i$) for a given stain i is calculated as a described by Equation 3.

$$IN_i = \sqrt{(L_{s_{io}} - L_{b_o})^2 + (a_{s_{io}} - a_{b_o})^2 + (b_{si_o} - b_{b_o})^2} \quad \text{Equation 1}$$

$$FN_i = \sqrt{\left(L_{s_{if}} - L_{b_o}\right)^2 + \left(a_{s_{i_f}} - a_{b_o}\right)^2 + (b_{s_i f} - b_{bo})^2} \quad \text{Equation 2}$$

$$SRI_i(\%) = \frac{IN_i - FN_i}{IN_i} \cdot 100 \quad \text{Equation 3}$$

EXAMPLES

Example 1: Comparative Stain Removal Performance of Fabric Treatment Process as a Function of Calcium Injected into the Wash Liquor All experiments are carried out using an Electrolux W565H programmable Front-Loading Washing Machine (FLWM). All machines are cleaned prior to use by conducting a 90° C. cotton cycle. Next, all the experiments are conducted using a washing cycle at 40° C. for 45 minutes where the main wash duration is 30 minutes. In all cases the ballast load is comprised of 60% of knitted cotton swatches (50 cm×50 cm) and 40% of polycotton fabric swatches (50 cm×50 cm). Furthermore, a set of stains comprising grease, enzymatic, particulate and colored beverage type of soils with two internal repeats are added to each wash. The set of stains is comprised of 2 knitted cotton swatches (20 cm×20 cm) containing the stains to be analyzed. All swatches are supplied by Warwick Equest Ltd (UK). All experiments were conducted with a liquid detergent formulation with the composition described in Table 1 (as TTW of the respective ingredients in the aqueous wash liquor formed thereby). The hardness of the water used in all experiments is moderate (~8 gpg).

TABLE 1

| Group | Component | TTW (ppm) |
|---|---|---|
| Surfactants | Sodium dodecyl benzenesulfonate (LAS) | 357 |
| | C14-15 AA with7EO | 202 |
| | C12-14 AES with 3 EO (70%) | 220 |
| | Lauramine oxide | 19 |
| | Fatty Acids | 121 |
| Builders/Chelant | Citric Acid | 156 |
| | Diethylene triamine penta(methyl phosphonic acid) (DTPMP) | 18 |
| Performance actives/preservatives | Polymer Lutensit Z96 | 25 |
| | Polyethylene glycol (PEG) - co - polyvinyl acetate (PvAc) | 51 |
| | Brighteners | 4 |
| | Preservatives | 0.1 |
| Enzymes/stabilisers | Protease | 2 |
| | Na Formate (40% solution) | 52 |
| Solvent/neutralizer/structurant | Ethanol | 19 |
| | 1,2 Propylene glycol | 190 |
| | NaOH | 204 |
| | MEA hydrogenated castor oil | 15 |

In all cases, 3 kg ballast load with the composition previously described, 4 SBL soil sheets (WFK Tesgewebe GmbH, Germany) and the stains to be analyzed are first added into the drum of the washing machine. Next, in the comparative washing process (experiment A), the required dosage of liquid detergent formulation (38 g) is added into a small plastic container and introduced into the drum of the washing machine prior to start the washing cycle.

In the inventive wash process, after the addition of the ballast load, the SBL soil sheets, the stains and the required dosage of liquid detergent formulation (38 g) as previously conducted for the comparative wash process, 20 mL of $CaCl2 \cdot 2H2O$ aqueous solution with the required concentration to achieve an equivalent concentration to 22 gpg (grains per gallon) through the wash was injected at different points in time as described below for each experiment (B-E).

B) Calcium delivered from the formulation at t=0 min (comparative)

C) Calcium injection at washing time t=5 min (comparative)

D) Calcium injection at washing time t=15 min (inventive)

E) Calcium injection at washing time t=25 min (inventive)

The injection of $CaCl2 \cdot 2H2O$ was conducted via the drawer of the washing machine followed by the addition of 0.4 L of water to ensure no residual chemistry was left in the drawer of the machine.

All the experiments were conducted considering 4 external repeats. After each cycle is finished, the ballast load and the stains are removed from the washing machine and introduced in an Electrolux T3290 gas dryer where they are dried for 30 minutes at low temperature. All the washing machines are then rinsed using a 4 minute rinse cycle before commencing the next experiment.

Table 2 shows the stain removal performance results obtained for each of the experiments. The Stain Removal Index (SRI) is calculated via image analysis under D65 standard illuminant conditions. The results presented are the average of the 2 internal repeats for each experimental condition and the 4 external repeats.

TABLE 2

| Stain | A (Reference) | ΔB | ΔC | ΔD | HSD |
|---|---|---|---|---|---|
| Bacon Grease Dyed GSRTBGD001 | 62.5 | 4.3 | 5.9 | 5.7 | 3.56 |
| Cooked Beef GSRTCB001 | 56.9 | 8.0 | 10.6 | 11.0 | 4.20 |
| Makeup Cover-girl CW120 GSRTCGM001 | 51.6 | 22.7 | 24.6 | 25.5 | 2.25 |
| Scrubbed Grass EQ062 | 65.1 | −8.1 | −4.8 | 0.9 | 3.93 |

TABLE 3

| Stain | A (Reference) | ΔE | HSD |
|---|---|---|---|
| Bacon Grease Dyed GSRTBGD001 | 61.7 | 7.4 | 1.83 |
| Cooked Beef GSRTCB001 | 58.5 | 10.2 | 2.32 |
| Makeup Cover-girl CW120 GSRTCGM001 | 52.6 | 23.0 | 5.75 |
| Scrubbed Grass EQ062 | 69.8 | −0.1 | 2.28 |

It can be observed in Table 2 and Table 3 that the benefits in stain removal observed for the grease stains (bacon grease, cooked beef and make-up) are observed in all inventive wash process (experiments D-E) regardless of the time at which the calcium salt was injected to the wash liquor. However, a delay in the injection of calcium salt through the wash (experiment E) is required to mitigate the losses in the extent of stain removal observed for some stains such as scrubbed grass, which are negatively affected by the level of hardness present in the wash liquor.

Example 2: Comparative Stain Removal Performance of Fabric Treatment Process in the Presence of Calcium in Short Washing Cycles All experiments are conducted in a mid-scale high throughput equipment that runs on a Peerless Systems platform. It consists of 10 vessels of 1 L capacity with a three-blade post agitator similar to the one used by Ganguli and Eenderbug (1980), which operate in parallel. The equipment is automatized so that filling, washing, draining and rinsing of the vessels is automatically conducted by the system.

Initially, cleaning of the vessels is conducted prior to start the wash process by adding 0.25 L of city water at the target washing temperature (30° C.) to each of the vessels of the equipment. The water remained in the vessels for 2 minutes under a constant agitation of 1800 degree/s. After draining the water used for the cleaning stage, 1 L of city water at the target washing temperature (30° C.) is added to each of the vessels. Next, the required dosage of the liquid detergent formulation (3.8 g) described in Table 4 (as TTW of the respective ingredients in the aqueous wash liquor formed thereby) is added to each of the vessels and agitated under a constant agitation of 1800 degree/s for 2 minutes. At this moment, the ballast comprising 50 g of knitted cotton swatches (5 cm×5 cm) and the test items containing the stains to be analyzed (10 g of 7 cm×7 cm knitted cotton swatches) are manually added to each of the vessels and the wash process is started.

In the wash process (experiment A), the main wash is conducted for 12 minutes without the addition of any calcium through the wash process. In the other wash process (experiments B-D), 10 mL of $CaCl2 \cdot 2H2O$ aqueous solution with the required concentration to achieve 22 gpg (grains per gallon) through the wash is injected at different times as described below:

B) Calcium is injected at washing time t=0 min (comparative)

C) Calcium is injected at washing time t=2 min (comparative)

D) Calcium is injected at washing time t=6 min (inventive)

In all cases, the main wash is conducted for 12 minutes at 30° C. and a constant agitation of 1800 degree/s followed by a 15 minute 30° C. rinse. After each washing cycle is finished, the ballast load and the stains are removed from the vessels and introduced in individual drying bags in all cases. Afterwards, the textiles are dried for 30 minutes at low temperature in an Electrolux T3290 gas dryer. The extent of stain removal is calculated as the color difference between the stain and the textile's background before and after wash as described by Equation 1-Equation 3.

TABLE 4

| Group | Component | TTW (ppm) |
|---|---|---|
| Surfactants | Sodium dodecyl benzenesulfonate (LAS) | 357 |
| | C14-15 AA with 7 EO | 202 |
| | C12-14 AES with 3 EO (70%) | 220 |
| | Lauramine oxide | 19 |
| Builders/ Chelant | Fatty Acids | 121 |
| | Citric Acid | 156 |
| | Diethylene triamine penta(methyl phosphonic acid) (DTPMP) | 18 |
| | Hydroxyethylidene diphosphonic acid (HEDP) | 25 |
| Performance actives/ preservatives | Polymer Lutensit Z96 | 25 |
| | Polyethylene glycol (PEG) - co - polyvinyl acetate (PvAc) | 51 |
| | Preservatives | 0.1 |
| | Na Formate (40% solution) | 52 |

TABLE 4-continued

| Group | Component | TTW (ppm) |
|---|---|---|
| Solvent/ neutralizer/ structurant | Ethanol | 19 |
| | 1,2 Propylene glycol | 190 |
| | NaOH | 204 |
| | MEA hydrogenated castor oil | 15 |

Table 5 shows the stain removal performance results obtained for each of the experiments. The Stain Removal Index (SRI) is calculated via image analysis under D65 standard illuminant conditions. The results presented are the average of the 2 internal repeats for each experimental condition and the 4 external repeats.

TABLE 5

| Stain | A (Reference) | ΔB (comparative) | ΔC (comparative) | ΔD (inventive) | HSD |
|---|---|---|---|---|---|
| Bacon Grease Dyed GSRTBGD001 | 54.54 | 10.57 | 8.17 | 6.88 | 4.59 |
| EQ Cooked Beef GSRTCB001 | 52 | 5.04 | 6.53 | 2.69 | 5.09 |
| EQ062 Grass (scrubbed) | 47.91 | −5.31 | −4.73 | −0.32 | 3.09 |

Table 5 shows that, while the benefits in stain removal for bacon grease and cooked beef stains are observed regardless of the time at which the calcium is injected to the wash liquor (experiments B-D), delaying the injection of calcium (experiment D) is necessary to mitigate the negatives observed in hardness sensitive stains such as scrubbed grass. These results are in agreement with the trends previously described in Table 3.

Example 3: Comparative Stain Removal Performance of Fabric Treatment Process in the Presence of Calcium Salts in Long Washing Cycles All experiments are conducted in a mid-scale high throughput equipment that runs on a Peerless Systems platform. It consists of 10 vessels of 1 L capacity with a three-blade post agitator similar to the one used by Ganguli and Eenderbug (1980), which operate in parallel. The equipment is automatized so that filling, washing, draining and rinsing of the vessels is automatically conducted by the system.

Initially, cleaning of the vessels is conducted prior to start the wash process by adding 0.25 L of city water at the target washing temperature (30° C.) to each of the vessels of the equipment. The water remained in the vessels for 2 minutes under a constant agitation of 1800 degree/s. After draining the water used for the cleaning stage, 1 L of city water at the target washing temperature (30° C.) is added to each of the vessels. Next, the required dosage of the liquid detergent formulation (3.8 g) described in Table 4 (as TTW of the respective ingredients in the aqueous wash liquor formed thereby) is added to each of the vessels and agitated under a constant agitation of 1800 degree/s for 2 minutes. At this moment, the ballast comprising 50 g of knitted cotton swatches (5 cm×5 cm) and the test items containing the stains to be analyzed (10 g of 7 cm×7 cm knitted cotton swatches) are manually added to each of the vessels and the wash process is started.

In the comparative wash process (experiment A), the main wash is conducted for 90 minutes without the addition of any salt through the wash process. In the inventive wash process (experiments B-E), 10 mL of $CaCl2\cdot 2H2O$ aqueous solution with the required concentration to achieve 22 gpg (grains per gallon) through the wash is injected at different times as described below:

B) Calcium is injected at washing time t=0 min (comparative)

C) Calcium is injected at washing time t=14 min (inventive)

D) Calcium is injected at washing time t=45 min (inventive)

E) Calcium is injected at washing time t=75 min (inventive)

In all cases, the main wash is conducted for 90 minutes at 30° C. at a constant agitation of 1800 degree/s followed by a 15 minute 30° C. rinse. After each washing cycle is finished, the ballast load and the stains are removed from the vessels and introduced in individual drying bags in all cases. Afterwards, the textiles are dried for 30 minutes at low temperature in an Electrolux T3290 gas dryer. The extent of stain removal is calculated as the color difference between the stain and the textile's background before and after wash as described by Equation 1-Equation 3.

Table 6 shows the stain removal performance results obtained for each of the experiments. The Stain Removal Index (SRI) is calculated via image analysis under D65 standard illuminant conditions. The results presented are the average of the 2 internal repeats for each experimental condition and the 4 external repeats.

TABLE 6

| Stain | A (Reference) | ΔB | ΔC | ΔD | ΔE | HSD |
|---|---|---|---|---|---|---|
| Bacon Grease Dyed GSRTBGD001 | 75.69 | 6.07 | 4.84 | 4.94 | 7.48 | 3.97 |
| Burnt Butter GSRTBB001 | 78.6 | 1.9 | 1.83 | 2.05 | 5.23 | 2.83 |
| Makeup GSRTCGM001 | 69.43 | 1.12 | 3.99 | 4.11 | 7.55 | 4.12 |
| Scrubbed Grass | 57.67 | −4.00 | 0.62 | −2.32 | 3.27 | 4.55 |

Table 6 shows that the addition of calcium through the wash leads to stain removal benefits for bacon grease, burnt butter and make up soils. The benefits are observed for all inventive wash processes (experiments C-E) regardless of the time at which the calcium is injected through the wash.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of laundering fabrics, comprising the steps of:

(a) contacting a laundry detergent to water to form a wash liquor, wherein the laundry detergent comprises detersive surfactant, and wherein the wash liquor comprises detersive surfactant at a concentration in the range of from about 100 ppm to about 2500 ppm;

(b) contacting fabric to the wash liquor, and washing the fabric in the wash liquor;

(c) after a period of time of at least about 6 minutes from contacting the fabric to the wash liquor, introducing calcium cations into the wash liquor to form a calcium enriched wash liquor, wherein the calcium enriched wash liquor comprises calcium cations at a concentration in the range of from about 20 ppm to about 400 ppm;

(d) washing the fabric in the calcium-enriched wash liquor for a period of time of at least about 2 minutes; and (e) removing the excess calcium-enriched wash liquor from the fabric and rinsing the fabric in water.

2. A method according to claim 1, wherein the laundry detergent comprises chelant, and optionally other detergent ingredients.

3. A method according to claim 1, wherein the laundry detergent comprises detersive surfactant, and the wash liquor formed in step (a) comprises detersive surfactant at a concentration in the range of from about 300 ppm to about 2500 ppm.

4. A method according to claim 1, wherein the detersive surfactant comprises alkyl benzene sulphonate.

5. A method according to claim 1, wherein the calcium cations in step (c) are introduced into the wash liquor in the form of an aqueous calcium slurry, wherein the aqueous calcium slurry comprises from about 5 wt % to about 80 wt % calcium salt.

6. A method according to claim 5, wherein the aqueous calcium slurry is formed by contacting calcium cations to water to form an aqueous calcium slurry comprising calcium cations at a concentration in the range of from about 5 wt % to about 80 wt % calcium salt.

7. A method according to claim 1, wherein the calcium enriched wash liquor formed in step (c) comprises calcium cation at a concentration in the range of from above about 100 ppm to about 300 ppm.

8. A method according to claim 1, wherein the laundry detergent comprises chelant, and wherein the chelant is selected from hydroxyethylidene diphosphonic acid (HEDP) and salts thereof; diethylene triamine penta(methylenephosphonic) acid (DTPMP) and salts thereof.

9. A method according to claim 1, wherein the laundry detergent comprises chelant, and the wash liquor formed in step (a) comprises chelant at a concentration in the range of from about 10 ppm to about 300 ppm.

10. A method according to claim 1, wherein the laundry detergent comprises amylase enzyme.

11. A method according to claim 1, wherein the laundry detergent comprises citric acid.

12. A method according to claim 1, wherein the water introduced into step (a) is pre-treated with a chelant prior to contacting the fabric with the wash liquor in step (b).

* * * * *